Feb. 19, 1929.
W. B. CROCKETT
CLIP FASTENER
Filed Jan. 27, 1928
1,702,596
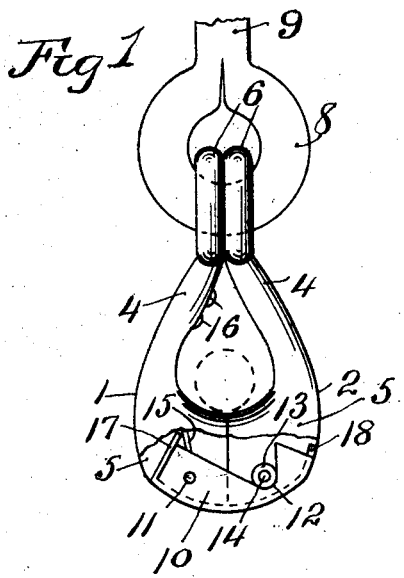
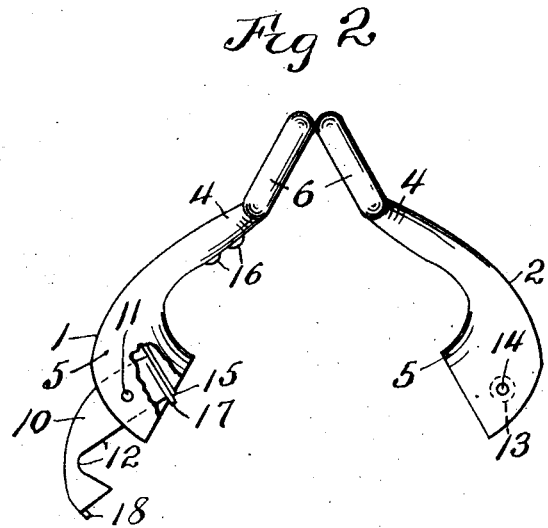
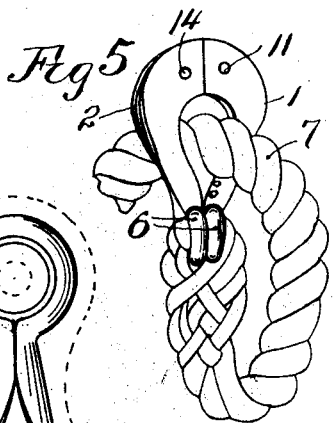
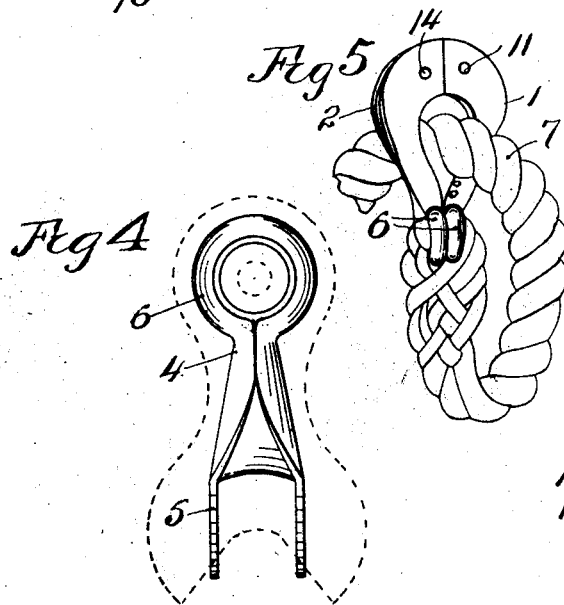
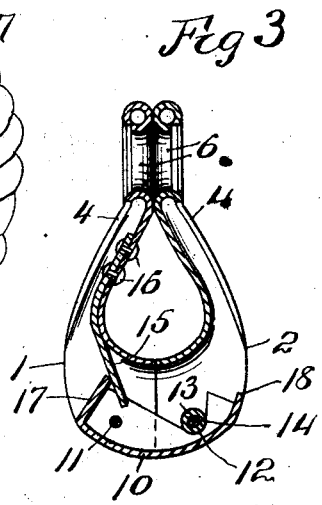
INVENTOR.
Walter B. Crockett
BY Warren D. House
His ATTORNEY
Witness
H. Vernon Olson Patented Feb. 19, 1929.

1,702,596

UNITED STATES PATENT OFFICE.

WALTER B. CROCKETT, OF KANSAS CITY, MISSOURI.

CLIP FASTENER.

Application filed January 27, 1928. Serial No. 249,858.

My invention relates to improvements in clip fasteners.

One of the objects of my invention is to provide a novel clip fastener, which may be used for various purposes and which is particularly well adapted for use as a noose clip at the end of a lariat for reeving the rope therethrough to form the noose.

A further object of my invention is to provide a clip fastener of the kind described, which is simple, cheap, strong, durable, not liable to breakage or to get out of order, and one in which the jaws will be securely held in the locked position, without liability of being accidentally opened, and which may be quickly unlocked to release the rope.

My invention provides further a novel clip jaw which is both light and strong, and which will not cut the rope or cause undue wear thereon in the use of the clip.

The novel features of my invention are hereinafter fully described and claimed.

In the accompanying drawing, which illustrates the preferred embodiment of my invention, Fig. 1 is a side elevation, partly broken away, shown in the locked position and pivotally mounted on an eye bar.

Fig. 2 is an elevation of the clip jaws, one of which is partly broken away, shown in the open unlocked position.

Fig. 3 is a central vertical sectional view of the clip, with the jaws shown locked together.

Fig. 4 is an outside edge view of one of the clip jaws, the blank from which it is formed being shown in dotted lines.

Fig. 5 is a perspective view of my improved clip fastener reduced, shown attached to one end of a rope, the rope being shown passed between the jaws to form a noose.

Similar reference characters designate similar parts in the different views.

The clip fastener comprises two jaws 1 and 2, which are alike, and each of which is adapted to be made of sheet metal, and is so formed as to have lightness and strength.

Each jaw 1 and 2 has at one end a hollow ring portion 6 from which radially diverges a tubular shank 4 the outer end of which merges into an arcuate channel 5, Figs. 3 and 4. The outer end of the channel 5 has its edges in the plane of the inner side of the ring 6, so that when the two jaws 1 and 2 are in the operative closed position, shown in Fig. 3, the rings 6 will register and the edges of opposing channels 5 will abut against each other, whereby the jaws will form a loop through which a rope 7, or other device may be passed.

The jaws may be pivotally mounted so as to be swung to and from the closed position, shown in Figs. 1, 3 and 5, by reeving one end of a rope 7 through the rings 6, the strands of the rope being spliced together, as shown in Fig. 5. The jaws 1 and 2 may then be swung to and from the closed position on that portion of the rope which extends through the rings 6.

Or the jaws may be pivotally supported upon a rigid eye bar by having the rings 6 mounted on the loop portion 8 of an eye bar 9, Fig. 1.

For fastening the jaws releasably together in the closed locked position, shown in Figs. 1, 3 and 5, I provide an arcuate channel latch 10, which is pivotally mounted on a transverse pin 11, which extends through the side walls of the latch 10 and through the side walls of the channel portion 5 of the jaw 1, Figs. 1, 2 and 3.

The side walls of the latch 10 are provided with notches 12 which are adapted to receive a roller 13 rotatably mounted on a pin 14 which extends transversely through the side walls of the channel portion 5 of the jaw 2. The roller 13 permits the latch to easily assume the locking position, and to be readily released therefrom manually.

For holding the latch 10 in the locking position, I provide a flat spring 15, one end portion of which is fastened, as by rivets 16, to the jaw 1 within the shank 4 thereof. The spring 15 is adapted to bear against the inner edge portion of a flange 17, with which the latch 10 is provided at the end adjacent to the pin 11. The pressure of the spring 15, when it bears against the edge of the flange 17, tends to normally hold the latch engaged with the roller 13, as shown in Fig. 3 and also in Fig. 1.

The latch 10, is of such form, that when it is in the locked position, its outer side will register with the adjacent edges of the flanges of the channel portions 5, and there will be no portions of the latch projecting outside the jaws 1 and 2, so that there is no liability of the latch being caught on an object and accidentally swung from the locked position.

The right end of the latch, as viewed in Fig. 3, may be provided with a lip 18 which projects beyond the adjacent ends of the side flanges of the latch. By inserting the finger between the side walls of the channel portion 5 of the jaw 2, the lip may be engaged and the latch easily swung outwardly to the unlocked projecting position shown in Fig. 2, in which position the spring 15 will bear against the flat inner side of the flange 17, thereby releasably holding the latch in the open unlocked projecting position, in which position of the latch, the jaws 1 and 2 will swing open, due to the pressure of the rope 7 thereon, to the position shown in Fig. 2, thus releasing the rope and permitting the noose to open to free the animal engaged thereby.

To reengage the rope with the jaws to form the noose, the rope may be slipped laterally between the jaws and the latter then closed and locked by swinging the latch 10 to the locked position engaged with the roller 13, in which position it will be held by the spring 15 again bearing against the edge of the flange 17.

As the rings 6 are circular in cross section, there are no portions thereof that will have a cutting effect on the rope 7.

By having the jaws formed of sheet metal, the clip will be strong and light, and by having the shank 4 tubular and tapering toward the ring 6, relatively great strength is afforded with a minimum of weight, a desideratum in noose clips.

I do not limit my invention to the structure shown and described, as many modifications of my invention, within the scope of the appended claims, may be made without departing from the spirit of my invention.

What I claim is:—

1. A clip of the kind described comprising two jaws having means adapted to engage a support so as to swing thereon to and from a closed position, a latch pivoted to one of said jaws and having means for releasably engaging the other jaw to hold the jaws closed, and a spring engaging said latch, the latter having means by which, when the jaws are closed, the spring can hold the latch in either the locking or the unlocked position.

2. A clip of the kind described comprising two jaws having means adapted to engage a support so as to swing thereon to and from a closed position, a latch pivoted to one of said jaws so as to swing thereon to and from a locking position, in which it will releasably engage the other jaw for holding the jaws closed, to an unlocked position projecting outside the jaw to which it is pivoted, and a spring engaging the latch, the latter having means by which, when the jaws are closed, it may be held by said spring in either the locked or unlocked position.

3. A sheet metal clip jaw having an end portion in the form of a hollow ring and provided with an arcuate-channel portion, and having a tubular shank extending radially from said ring and connecting said ring and channel portions.

4. A sheet metal clip jaw having an end portion in the form of a hollow ring and provided with a tubular shank which diverges radially from said ring.

5. A sheet metal clip jaw of the kind described having at one end a hollow ring and at the other end an arcuate channel portion, and having a flaring tubular shank connecting said ring and channel portion.

6. A sheet metal clip jaw of the kind described having at one end a hollow ring and at the other end an arcuate channel portion, and having a flaring tubular shank connecting said ring and channel portion, the outer end edges of the latter being in the plane of one side of said ring.

In testimony whereof I have signed my name to this specification.

WALTER B. CROCKETT